(12) United States Patent
Maruyama

(10) Patent No.: US 6,775,064 B2
(45) Date of Patent: Aug. 10, 2004

(54) OBJECTIVE LENS FOR OPTICAL PICK-UP

(75) Inventor: Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/918,440

(22) Filed: Aug. 1, 2001

(65) Prior Publication Data

US 2002/0034010 A1 Mar. 21, 2002

(30) Foreign Application Priority Data

Aug. 4, 2000 (JP) ........................................ 2000-236717

(51) Int. Cl.$^7$ .............................................. G02B 5/18
(52) U.S. Cl. .............. 359/569; 369/112.07; 369/112.11
(58) Field of Search ................................ 359/565, 566, 359/569, 708–719; 369/112.05, 112.06, 112.07, 112.08, 112.11, 112.12, 112.13

(56) References Cited

U.S. PATENT DOCUMENTS

| | | | |
|---|---|---|---|
| 6,043,912 A | * | 3/2000 | Yoo et al. ..................... 359/19 |
| 6,088,322 A | | 7/2000 | Broome et al. ............. 369/112 |
| 6,118,594 A | | 9/2000 | Maruyama .................. 359/719 |
| 6,313,956 B1 | * | 11/2001 | Saito .......................... 359/721 |
| 6,370,103 B1 | * | 4/2002 | Yamazaki et al. ...... 369/112.26 |

FOREIGN PATENT DOCUMENTS

JP    2000-98220    4/2000

* cited by examiner

Primary Examiner—Mark A. Robinson
Assistant Examiner—Alessandro Amari
(74) Attorney, Agent, or Firm—Greenblum & Bernstein, P.L.C.

(57) ABSTRACT

The objective lens is a biconvex plastic lens having first and second surfaces which are both aspheric. The objective lens is divided into an inside area which is inside of a circle of an effective diameter of the objective lens and an outside area which is outside of the circle of the effective diameter. A diffractive lens structure having a plurality of concentric ring-shaped steps is formed in the inside area. A surface of the outside area is continuous with no steps and corresponds to a macroscopic base curve of the inside area. The objective lens has a gap of a spherical aberration between the inside area and the outside area.

12 Claims, 4 Drawing Sheets

OBJECTIVE LENS FOR OPTICAL PICK-UP

BACKGROUND OF THE INVENTION

The present invention relates to an objective lens for an optical pick-up of an optical disc drive, which is capable of reading/writing data from/to a plurality of kinds of optical discs whose cover layers have different thicknesses. In particular, the present invention relates to an objective lens formed with a diffractive lens structure on a surface of a refractive lens.

Generally, an optical pick-up for an optical disc drive is provided with a laser source, such as a laser diode, an objective lens which converges the laser beam emitted by the laser source on an information layer of the optical disc to form a beam spot thereon, and a signal detecting system that receives the laser beam which is reflected by the information layer of the optical disc and passes through the objective lens. The signal detecting system produces various signals based on the received laser beam.

There are various types of optical discs on which digital information is recorded at various densities, respectively. An effective diameter of an objective lens of an optical pick-up depends on an NA (numerical aperture), which is determined based on the density of the information recorded on the optical disc.

Generally, an objective lens used for a compact optical pick-up is made of a resin and is formed by means of an injection molding. A flow of material of a lens in the process of the injection molding is easily disturbed at an outer portion thereof and/or at a portion where the shape of the lens changes by a large amount. Therefore, in order to fabricate a lens having a necessary performance even at the outermost area within the effective diameter thereof, it is preferable that the lens has an outer diameter which is sufficiently larger than the effective diameter thereof, so that the change of the shape of the lens at the peripheral portion within the effective diameter area is prevented.

However, if the objective lens is optimized so that the above condition is satisfied, the optical performance of the lens at portions in the vicinity of the effective diameter may be continuous since the change of the shape is relatively small at the portions. This means that the effective diameter is substantially enlarged, which causes a bad influence on the formation of the beam spot on the optical disc. That is, if the effective diameter becomes greater, the NA becomes greater, which results in reduction of the size of the beam spot. Further, in such a configuration, if the optical disc inclines with respect to the objective lens, too much aberration occurs, which prevents recording/reading of the digital information on the optical disc.

However, if the peripheral portion outside the effective area of the objective lens is not optimized, due to the aberration caused by the peripheral portion, the size of the beam spot may become larger, which also prevents recording/reading of the digital information on the optical disc.

In order to avoid the above problems, in the prior art, an aperture stop member is provided on the light source side of the objective lens so that the beam incident on the objective lens is confined to the effective area thereof.

However, if the aperture stop member is located on the light source side of the objective lens, a size of an optical system of the optical pick-up along an optical axis direction increases, which prevents the downsizing of the optical system of the optical pick-up.

SUMMARY OF THE INVENTION

It is therefore an object of the present invention to provide an objective lens for an optical pick-up, with which light passing through the peripheral area, which is outside the effective area, does not have bad effect in forming a beam spot on an information layer of an optical disc without employing the aperture stop member.

For the object, according to the invention, there is provided an objective lens for an optical pick-up, which is configured such that at least one surface of the objective lens is an aspherical surface. The at least one surface is divided into an effective area and an outer area which is an area outside the effective area. The effective area and the outer area are formed such that a predetermined gap is caused between a spherical aberration of a light beam passed through the effective area and a spherical aberration of a light beam passed through the outer area. The light beam passed through the effective area forms a beam spot on a predetermined surface, while the light beam passed through the outer area is diffused on the predetermined surface.

With this configuration, due to the gap of the spherical aberrations of the beams respectively passed through the effective area and the outer area, the light passed through the outer area does not have bad effect in forming a beam spot on an information layer of an optical disc. Thus, if such a lens is used, it is unnecessary to employ the aperture member, and the optical performance thereof will not be deteriorated.

Optionally, a diffraction lens structure may be formed on the at least one surface within the effective area. The outer area may be connected with a base curve which is a macroscopic shape of the at least one surface within the effective area of the at least one surface.

Further optionally, the diffraction lens structure may include a plurality of concentric annular zones formed on said at least one surface. A step in a direction of the optical axis may be formed at every border between adjacent annular zones.

It is preferable that an absolute value of the gap of the spherical aberrations may be substantially equal to or greater than 10 micrometers.

In a particular case, the absolute value of the gap may be approximately 200 micrometers.

Still optionally, the surface of said outer area may be a continuous surface having no diffraction lens structure.

According to another aspect of the invention, there is provided an objective lens for an optical pick-up, at least one surface of said objective lens being an aspherical surface. The at least one surface may be divided into an effective area and an outer area outside said effective area. The effective area and the outer area may be formed such that the light beam passed through the effective area forming a beam spot on a predetermined surface, while the light beam passed through the outer area is diffused on the predetermined surface.

BRIEF DESCRIPTION OF THE ACCOMPANYING DRAWINGS

FIGS. 1A–1C schematically show configurations of an objective lens according to the present invention;

FIG. 2 shows an optical system of an optical pick-up that employs the objective lens shown in FIG. 1;

FIG. 3 schematically shows an objective lens according to a first embodiment of the present invention;

DETAILED DESCRIPTION OF THE EMBODIMENTS

Figure 1B:
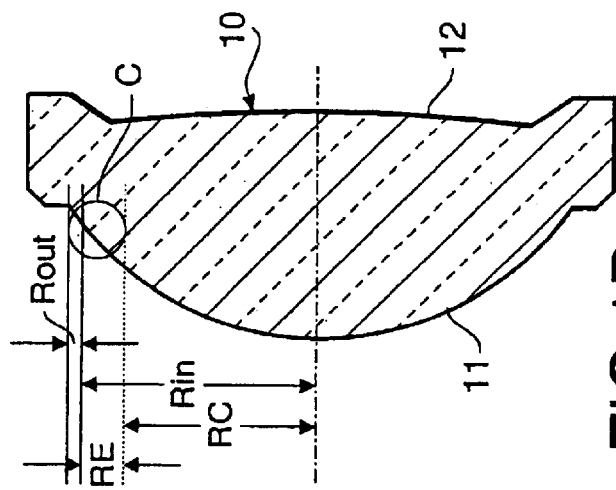
Figure 1A:
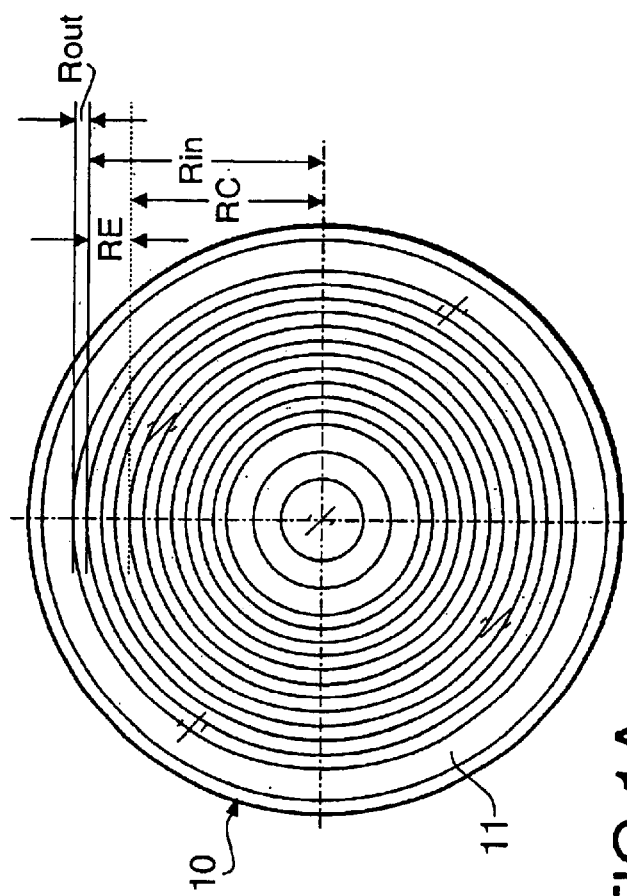
Figure 1C:
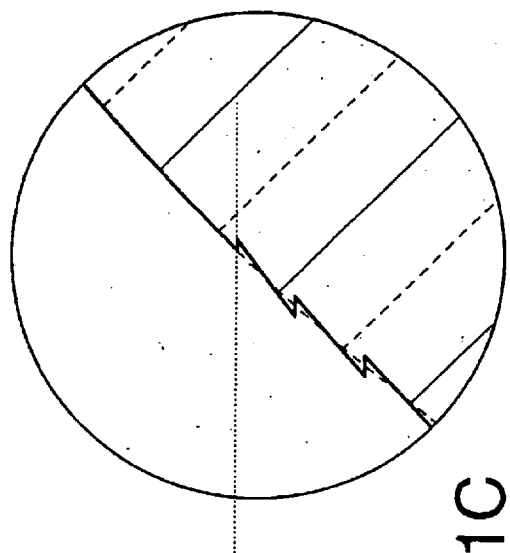

FIGS. 1A, 1B and 1C schematically show a configuration of an objective lens 10 according to an embodiment of the present invention. FIG. 1A is a front view, FIG. 1B is a cross-sectional view, and FIG. 1C is an enlarged view of a part of FIG. 1B.

The objective lens 10 is applicable to an optical pick-up of an optical disc drive that is capable of recording/reproducing digital information on/from a plurality of kinds of optical discs (e.g., CD, CD-R and DVD). The objective lens 10 functions to converge a laser beam emitted by a laser diode onto an information layer of an optical disc.

The objective lens 10 is a biconvex plastic lens having first and second surfaces 11 and 12 each of which is a rotationally-symmetrical, aspherical surface. A diffractive lens structure is formed on the first surface 11. As shown in FIG. 1A, the diffractive lens structure includes a plurality of concentric annular zones. The diffractive lens structure has minute steps in an optical axis direction at the boundaries between the annular zones, likewise a Fresnel lens structure, as shown in FIG. 1C. The second surface 12 is formed as a continuous surface without such a diffraction lens structure.

The first surface 11 is divided into an inside area (which will also be referred to as an effective area) Rin which is inside a circle of an effective diameter of the objective lens 10, and an outside area Rout which is outside the circle of the effective diameter of the objective lens 10 (i.e., outside the effective area).

According to the embodiment, the objective lens 10 is configured to be applicable to an optical pick-up compatible to various types of optical discs, e.g., CD, CD-R and DVD. For this purpose, the inside area Rin is divided into a common area RC and a high NA exclusive area RE. The common area RC contributes to converge a light beam at a low NA, which is necessary and sufficient for an optical disc having a low recording density such as a CD or a CD-R, on the information layer of the optical disc. Both the common area RC and the high NA exclusive area RE contribute to converge a light beam at a high NA, which is necessary for an optical disc having a high recording density such as a DVD only, on the information layer of the optical disc.

The diffractive lens structure is formed over the entire effective area, which includes the common area RC and the high NA exclusive area RE. The common area RC is inside a circle at which a light beam whose NA is 0.45 through 0.50 passes, and the high NA exclusive area RE, which surrounds the common area RC, is inside a circle at which a light beam whose NA is about 0.60 passes.

The outside area Rout is configured to be continuous, without steps, and continuously connected from a macroscopic base curve, which is indicated by dashed lines in FIG. 1C, of the outer portion of the effective area Rin. With this configuration, a certain amount of gap in a spherical aberration is generated between the inside area Rin and the outside area Rout. Specifically, the absolute value of the gap of the spherical aberrations is set to 10 micrometers or more so that the light beam passing through the outside area Rout diffuses, while a beam spot is formed by the light beam passed through the inside area Rin.

Optionally, another Fresnel lens structure may be formed on the outside area Rout to generate a sufficient gap in the spherical aberration between the inside area Rin and the outside area Rout.

Figure 2:
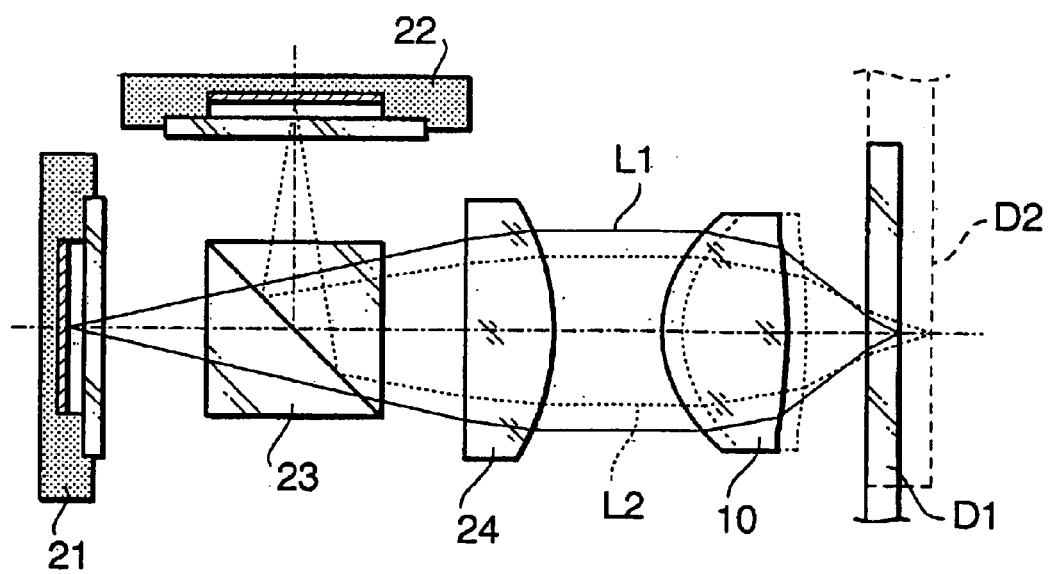

FIG. 2 shows an exemplary optical system of the optical pick-up that employs the objective lens 10 according to the invention. The optical system of the optical pick-up includes a DVD module 21, a CD module 22, a beam combiner 23, a collimating lens 24 and the objective lens 10. Each of the modules 21 and 22 is provided with a laser diode and a photo detector which are mounted on a common substrate. The objective lens 10 is arranged to be movable in the optical axis direction for focusing, and in the radial direction of the optical disc for tracking, by means of well-known focusing and tracking mechanisms, respectively.

The DVD is a thin cover type optical disc that has higher recording density and the thickness of the cover layer thereof is 0.6 mm. In order to form a small beam spot on the DVD, a laser beam whose wavelength is within a range of 635 nm through 665 nm is required.

The CD-R and the CD are thick cover type optical discs have a lower recording density. The thickness of the cover layer of the CD-R or the CD is 1.2 mm. The CD-R requires near-infrared radiation due to its spectral reflectance.

Therefore, the laser diode of the DVD module 21 emits a laser beam $L_1$ having a wavelength of 657 nm or 660 nm, and the laser diode of the CD module 22 emits a laser beam $L_2$ having a wavelength of 785 nm or 790 nm.

When the thin cover type optical disc D1 (shown by the solid line) is used, the DVD module 21 is driven to emit the laser beam $L_1$ which is shown by a solid line, and a relative position of the objective lens 10 with respect to the optical disc is as shown by the solid lines. The laser beam $L_1$ is converged onto the information layer of the thin cover type optical disc D1 through the thin cover layer.

When the thick cover type optical disc D2 is used, the CD module 22 is driven to emit the laser beam $L_2$ shown by a broken line, and a relative position of the objective lens 10 with respect to the optical disc is closer to follow the change of the distance to the information layer as shown by broken lines in FIG. 2. The laser beam $L_2$ is converged onto the information layer of the thick cover type optical disc D2 through the thick cover layer.

The laser beam reflected from the information layer of the optical disc D1 is received by the photo-detector provided in the DVD module 21. The laser beam reflected from the information layer of the optical disc D2 is received by the photo-detector provided in the CD module 22. Then, based on the output of the photo-detector, a focusing error signal and a tracking error signal are generated. When the information is to be reproduced, a reproducing signal of recorded information is also generated based on the output of the photo-detector.

Next, the configuration of the diffractive lens structure formed on the first surface 11 of the objective lens 10 will be described.

The diffractive lens structure formed in the common area RC functions such that a predetermined order (a first order, in the embodiment) diffraction light component having a short wavelength (657 nm or 660 nm) forms an appropriate wavefront for the thin cover type optical disc D1, and the same order diffraction light component having a long wavelength (785 nm or 790 nm) forms an appropriate wavefront for the thick cover type optical disc D2.

The diffractive lens structure in the common area RC is formed such that a change of spherical aberration due to a change of thickness of the cover layer is compensated by a change of the wavelength of the incident beams. Namely, the diffractive lens structure in the common area RC is configured such that the spherical aberration changes in the undercorrected direction as the wavelength increases.

Specifically, the spherical aberration changes in the overcorrected direction as the thickness of the cover layer increases. On the other hand, due to the above-described configuration of the diffractive lens structure in the common area RC, the spherical aberration changes in the undercorrected direction as the wavelength of the incident laser beam increases. In addition, a longer wavelength laser beam is used for the thick cover type optical disc D2 and a shorter wavelength light beam is used for the thin cover type optical disc D1, as described above. Accordingly, the change of the spherical aberration due to a change of the thickness of the cover layer can be counterbalanced by the change of the spherical aberration due to the wavelength dependence realized by the diffractive lens structure.

The diffractive lens structure formed on the high NA exclusive area RE is configured to exhibit a smaller wavelength dependence in a spherical aberration than that of the common area RC, and is designed such that a spherical aberration at the short wavelength (657 nm or 660 nm) is adequately corrected for the thin cover type optical disc D1.

With this configuration, when the thin cover type optical disc D1 is used, the spherical aberration of the light, whose wavelength is 657 nm or 660 nm and which is passed through each of the areas RC and RE, is well-compensated. Therefore, the high NA condition is achieved, and accordingly, a relatively small beam spot, which is suitable for the high recording density optical disc D1, can be formed on the information layer of the optical disk D1.

When the thick cover type optical disc D2 is used, the spherical aberration of the light whose wavelength is 790 nm or 785 nm and which is passed through the common area RC is well compensated. On the contrary, the spherical aberration of the light, whose wavelength is 790 nm or 785 nm and which is passed through the high NA exclusive area RE, is not adequately compensated. Therefore, the laser beam of 790 nm or 785 nm passed through the high NA exclusive area RE diffuses over areas around and apart from the beam spot formed by the portion of the beam passed through the common area RC. As a result, the low NA can be achieved. Accordingly, a large beam spot, which is suitable for the thick cover type optical disc having low recording density, is formed on the information layer of the optical disc D2.

In either of the cases where the disc D1 is used and where the disc D2 is used, the laser beam passed through the outside area Rout diffuses sufficiently in contrast to the beam spot formed by the laser beam passed through the inside area Rin because there is a gap in the spherical aberration between the light passed through the outside area Rout and the light passed through the inside area Rin.

Hereinafter, two numerical embodiments according to the invention will be described in detail. The objective lenses indicated below are designed for a CD/DVD compatible optical pick-up that can use the thin cover type optical disc D1 (e.g., DVD) having a cover layer of 0.6 mm, and the thick cover type optical disc D2 (e.g., CD or CD-R) having a cover layer of 1.2 mm. The objective lens 10 has the diffractive lens structure on the first surface 11 and converges the first order diffraction beam onto the information layer of the optical disc.

First Embodiment

Figure 3:
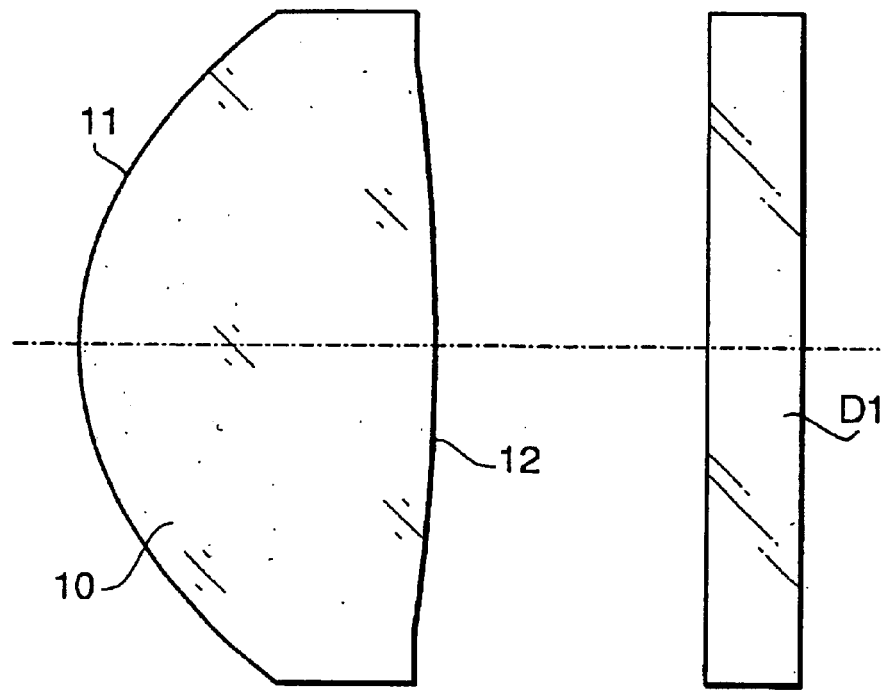

FIG. 3 schematically shows the objective lens 10, according to the first embodiment, and the thin cover type optical disc D1. The effective diameter of the objective lens 10 is 4.04 mm. The inside area Rin of the objective lens 10 is divided into the common area ($0 \leq h < 1.69$ mm) and the high NA exclusive area ($1.69 \leq h < 2.02$ mm), where h represents a height from the optical axis. The diffractive lens structures formed in the common area RC and in the high NA exclusive area RE are defined by different optical path difference functions, respectively.

A base curve of the common area RC, which is the shape of a lens surface of the refractive lens without the diffractive lens structure in the common area RC, is a rotationally-symmetrical aspherical surface that is different from a base curve of the high NA exclusive area RE, which is also a rotationally-symmetrical aspherical surface. The surface of the outside area Rout ($2.02 \leq h < 2.18$ mm) is a continuous surface without any steps and continuously connected to the base curve of the high NA exclusive area RE. The second surface 12 of the objective lens 10 is a continuous aspherical surface without a diffractive lens structure.

The common area RC and the high NA exclusive area RE of the first surface 11, and the second surface 12 are rotationally-symmetrical aspherical surfaces. Generally, a rotationally-symmetrical aspherical surface is expressed by the following equation:

$$X(h) = \frac{ch^2}{1+\sqrt{1-(1+K)c^2h^2}} + A_4h^4 + A_6h^6 + A_8h^8 + A_{10}h^{10} + A_{12}h^{12}$$

where, X(h) is a sag, that is, a distance of a point, whose height from the optical axis is h, on the rotationally-symmetrical aspherical surface with respect a tangential plane, which is tangential to the surface at a point where the optical axis intersects with the surface. Symbol c represents a curvature (1/r) of the vertex of the surface, K is a conic constant, and $A_4$, $A_6$, $A_8$, $A_{10}$ and $A_{12}$ are aspherical surface coefficients of fourth, sixth, eighth, tenth and twelfth orders, respectively.

An additional optical path length $\Phi(h)$, which is added by the diffractive lens structure, is expressed by the following optical path difference function:

$$\Phi(h) = (P_2h^2 + P_4h^4 + P_6h^6 + \ldots) \times m \times \lambda$$

where $P_2$, $P_4$ and $P_6$ are coefficients of second, fourth and sixth orders, h represents a height from the optical axis, m represents a diffraction order, and $\lambda$ represents a working wavelength. The optical path difference $\Phi(h)$ indicates a difference of an optical path length of a hypothetical ray of light which does not pass through the diffractive lens structure and an optical path length of a ray of light which is diffracted by the diffraction lens structure, at the height h from the optical axis. In other words, the optical path difference $\Phi(h)$ represents the additional optical path length of each ray of light which is diffracted by the diffractive lens structure.

An actual microscopic shape of the diffractive lens structure is defined by subtracting $\lambda \times m$ (m integer), i.e., an integral multiple of λ, from Φ'(h) to have a stepwise additional optical path length Φ'(h), similar to the Fresnel lens. Specifically, the additional optical path length Φ'(h) is expressed by the following formula.

$$\Phi'(h) = (MOD(P_2h^2 + P_4h^4 + P_6h^6 + \ldots + CONST, 1) - CONST) \times \lambda_B$$

where, MOD is a modulo function, and $\lambda_B$ is a blazed wavelength, at which an optical path length difference generated by the minute step of the diffractive lens structure becomes equal to one wavelength, i.e., diffraction efficiency is maximized. The constant CONST defines a phase of a boundary between the annular zones and could be an arbitrary value satisfying a condition: $0 \leq CONST < 1$. It should be noted that the modulo function MOD (x, y) represents a remainder when x is divided by y. When MOD $(P_2h^2 + P_4h^4 + P_6h^6 + \ldots + CONST, 1)$ is equal to zero, a position at the height h, from the optical axis, represents the position of the boundary between two annular zones.

Data of the objective lens 10 according to the first embodiment is shown in TABLE 1 below.

TABLE 1

| | $NA_1 = 0.60$ | $f_1 = 3.360$ | $\lambda_1 = 657$ nm | |
| | $NA_2 = 0.50$ | $f_2 = 3.384$ | $\lambda_2 = 790$ nm | |

| | First surface | | | |
| --- | --- | --- | --- | --- |
| | Common area ($0 \leq h < 1.69$) | High-NA exclusive area ($1.69 \leq h < 2.02$) | Outside area ($2.02 \leq h < 2.18$) | Second surface |
| r | 2.101 | 2.129 | 2.129 | −8.450 |
| κ | −0.500 | −0.500 | −0.500 | 0.0 |
| $A_4$ | $-1.81100 \times 10^{-3}$ | $-6.72000 \times 10^{-4}$ | $-6.72000 \times 10^{-4}$ | $1.60200 \times 10^{-2}$ |
| $A_6$ | $-2.44900 \times 10^{-4}$ | $-1.46200 \times 10^{-5}$ | $-1.46200 \times 10^{-5}$ | $-3.26800 \times 10^{-3}$ |
| $A_8$ | $-1.75000 \times 10^{-5}$ | $-8.69200 \times 10^{-5}$ | $-8.69200 \times 10^{-5}$ | $1.29900 \times 10^{-4}$ |
| $A_{10}$ | $-3.51400 \times 10^{-6}$ | $2.19000 \times 10^{-5}$ | $2.19000 \times 10^{-5}$ | $3.20300 \times 10^{-5}$ |
| $A_{12}$ | $-2.56000 \times 10^{-6}$ | $-5.36100 \times 10^{-6}$ | $-5.36100 \times 10^{-6}$ | $-3.74500 \times 10^{-6}$ |
| $P_2$ | 0.0 | −2.56044 | — | — |
| $P_4$ | −1.65300 | −0.80000 | — | — |
| $P_6$ | −0.15050 | −0.09000 | — | — |
| $P_8$ | 0.0 | 0.0 | — | — |
| $P_{10}$ | 0.0 | 0.0 | — | — |
| $P_{12}$ | 0.0 | 0.0 | — | — |
| D | 2.210 | | | |
| n657 | 1.54059 | | | |
| n790 | 1.53653 | | | |

TABLE 1 shows the coefficients that define the base curve and the diffractive lens structure of the common area RC, the coefficients that define the base curve and the diffractive lens structure of the high NA exclusive area RE, the coefficients that define the outside area, the coefficients that define the second surface 12, the distance D along the optical axis between the surfaces 11 and 12 of the objective lens 10, and refractive indices n657 and n790 at the wavelengths of 657 nm and 790 nm, respectively. In TABLE 1, $NA_1$, $f_1$ and $\lambda_1$ denote a numerical aperture, a focal length (unit: mm) and a wavelength (unit: nm) for the thin cover type optical disc D1, and $NA_2$, $f_2$ and $\lambda_2$ denote a numerical aperture, a focal length (unit: mm) and a wavelength for the thick cover type optical disc D2, respectively. Further, r denotes a radius of curvature of a surface at a paraxial portion of the surface.

Figures 4A, 4B, 4C:
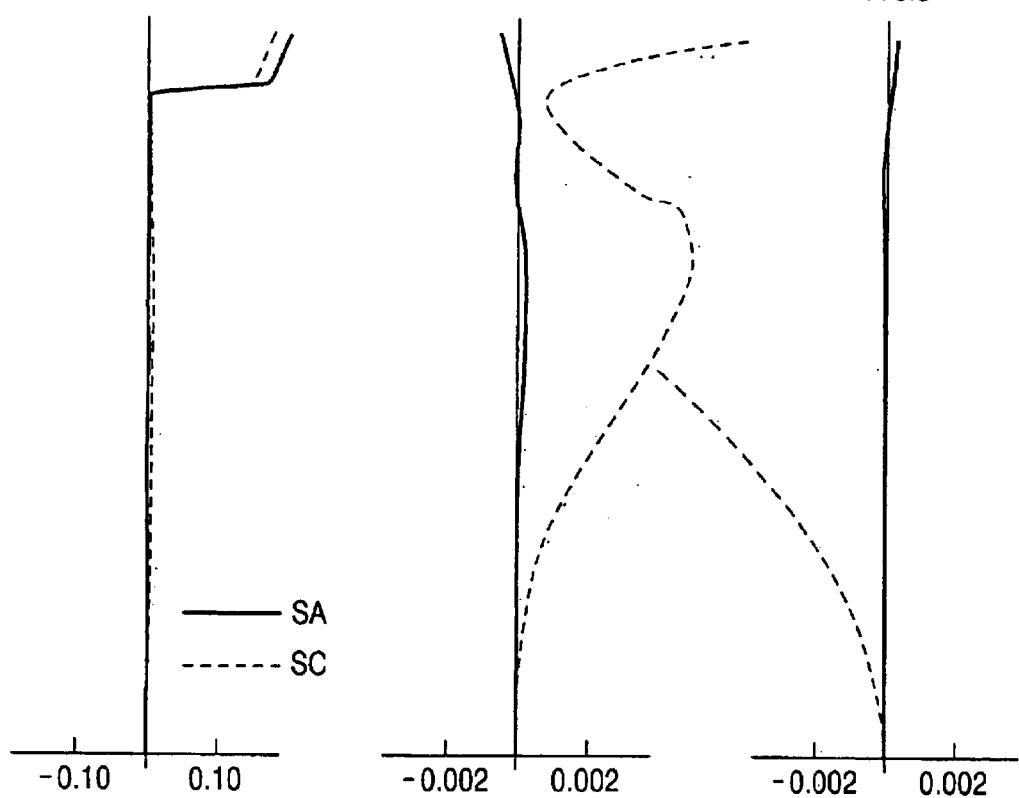
FIGS. 4A–4C show aberrations of an optical system including the objective lens and a cover layer of the optical disc shown in FIG. 3.

FIGS. 4A–4C show aberrations of the optical system including the objective lens 10 according to the first embodiment and the cover layer of the optical disc. FIG. 4A shows a spherical aberration SA and sine condition SC in a case where the thin cover type optical disc is used and the radius of the light beam incident on the objective lens 10 is 2.18 mm.

FIG. 4B shows a spherical aberration SA and sine condition SC in a case where the thin cover type optical disc is used and the radius of the light beam incident on the objective lens 10 is 2.02 mm.

FIG. 4C shows a spherical aberration SA and sine condition SC in relation to NA (for NA<0.50) when the thick cover type optical disc is used.

As shown in FIG. 4A, the spherical aberration has a gap of approximately 200 micrometers between the inside area Rin and the outside area Rout. It should be noted that, if the absolute value of the gap between the spherical aberrations caused by the inside area Rin and outside area Rout is 10 micrometers or greater, the light beam passed through the outside area Rout is effectively diffused. In the embodiment, the gap is much greater than 10 micrometers, the light beam passed through the outside area Rout is sufficiently diffused in contrast to the beam spot formed by the light beam passed through the inside area Rin.

Figure 5:
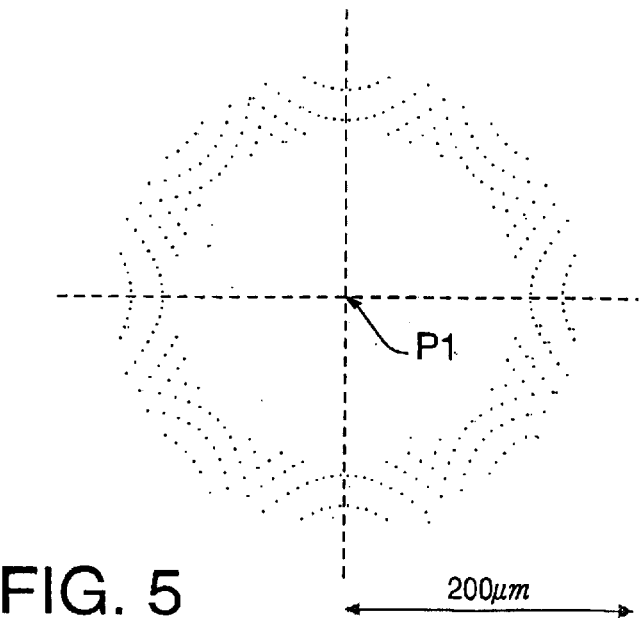
FIG. 5 shows a spot diagram on the information layer of the optical disc when the objective lens according to the first embodiment is used.

FIG. 5 shows a spot diagram on the information layer when the thin cover type optical disc is used. It should be noted that the light beam passed through the inside area Rin converges onto a point P1, while the light beam passed through the outside area Rout is diffused over an annular area which is spaced from the point P1 by approximately 100 micrometers. Therefore, the light beam passed through the outside area Rout does not affect the beam spot formed by the light beam passed through the inside area Rin even though no aperture stop member or the like is provided.

Second Embodiment

Data of the objective lens 10 of a second embodiment is shown in TABLE 2 below.

TABLE 2

| | $NA_1 = 0.60$ | $f_1 = 2.340$ | $\lambda_1 = 660$ nm | |
| | $NA_2 = 0.53$ | $f_2 = 2.360$ | $\lambda_2 = 785$ nm | |

| | First surface | | | |
| --- | --- | --- | --- | --- |
| | Common area ($0 \leq h < 1.25$) | High-NA exclusive area ($1.25 \leq h < 1.40$) | Outside area ($1.40 \leq h < 1.50$) | Second surface |
| r | 1.580 | 1.533 | 1.533 | −5.288 |
| κ | −0.520 | −0.520 | −0.520 | 0.0 |
| A4 | $-8.30300 \times 10^{-3}$ | $-4.30300 \times 10^{-3}$ | $-4.30300 \times 10^{-3}$ | $4.26300 \times 10^{-2}$ |
| A6 | $-9.77300 \times 10^{-4}$ | $-1.39500 \times 10^{-3}$ | $-1.39500 \times 10^{-3}$ | $-9.63400 \times 10^{-3}$ |
| A8 | $3.59400 \times 10^{-4}$ | $1.71700 \times 10^{-3}$ | $1.71700 \times 10^{-3}$ | $-3.48400 \times 10^{-3}$ |
| A10 | $-6.68900 \times 10^{-4}$ | $-1.23600 \times 10^{-3}$ | $-1.236000 \times 10^{-3}$ | $3.49900 \times 10^{-3}$ |
| A12 | $-1.34300 \times 10^{-4}$ | $2.54100 \times 10^{-4}$ | $-2.54100 \times 10^{-4}$ | $-7.10600 \times 10^{-4}$ |
| $P_2$ | 0.0 | −4.42763 | — | — |
| $P_4$ | −7.57700 | −4.87000 | — | — |
| $P_6$ | −0.73830 | −0.60200 | — | — |
| $P_8$ | −0.13650 | 0.0 | — | — |
| $P_{10}$ | 0.0 | 0.0 | — | — |
| $P_{12}$ | 0.0 | 0.0 | — | — |
| D | 1.400 | | | |
| n660 | 1.54044 | | | |
| n785 | 1.53665 | | | |

The effective diameter of the objective lens 10 is 2.80 mm. Similarly to the first embodiment, the inside area Rin of the objective lens 10 is divided into the common area RC (0≦h<1.25 mm) and the high NA exclusive area RE (1.25≦h<1.40 mm), where h represents a height from the optical axis. The diffractive lens structure formed in the common area RC is defined by an optical path difference function which is different from that defining the high NA exclusive area RE.

A base curve of the common area RC, which is a shape of the surface of a refractive lens excluding the diffractive lens structure, is a rotationally-symmetrical aspherical surface that is different from the base curve of the high NA exclusive area RE, which is also a rotationally-asymmetrical aspherical surface. The surface of the outside area Rout (1.40≦h<1.50 mm) is a continuous surface with no diffraction lens structure and continuously connected with the base curve of the high NA exclusive area RE. The second surface is a continuous aspherical surface without diffraction lens structure.

Figures 6A, 6B, 6C:
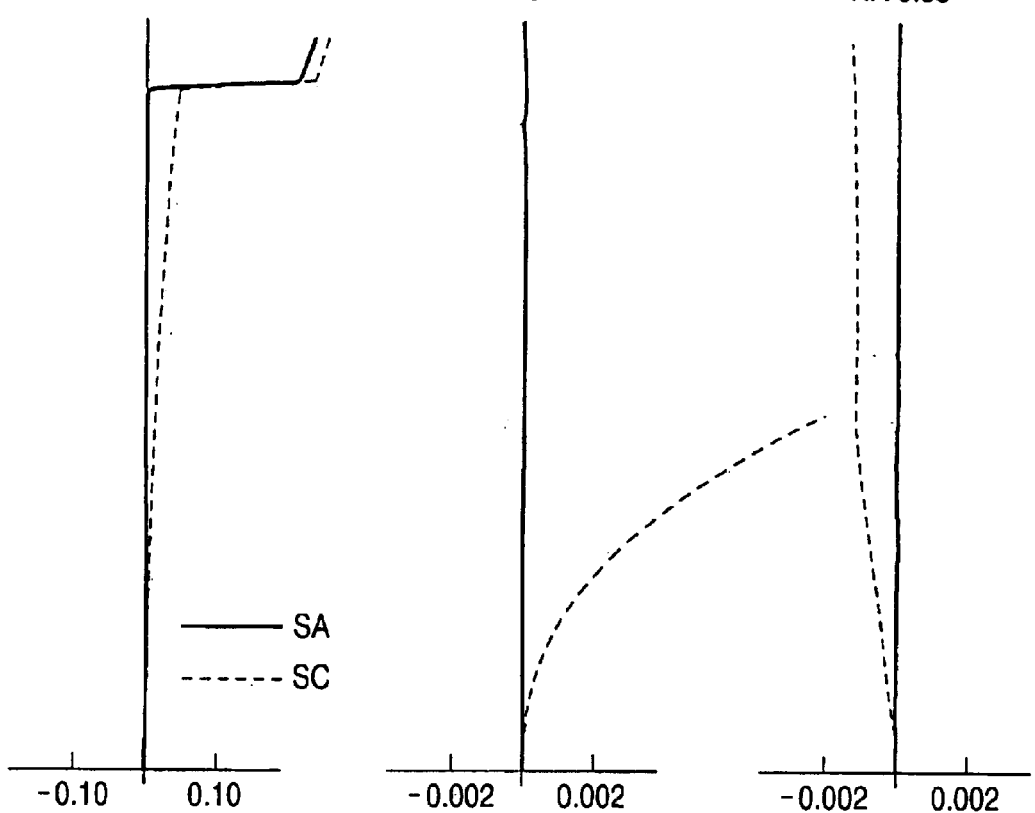
FIGS. 6A–6C show aberrations of the optical system including an objective lens according to a second embodiment.

FIGS. 6A–6C show aberrations of the optical system including the objective lens and the cover layer of the optical disc. FIG. 6A shows a spherical aberration SA and sine condition SC in a case where the thin cover type optical disc is used and the radius of the light beam incident on the objective lens 10 is 1.50 mm.

FIG. 6B shows a spherical aberration SA and sine condition SC in a case where the thin cover type optical disc is used and the radius of the light beam incident on the objective lens 10 is 1.40 mm.

FIG. 6C shows a spherical aberration SA and sine condition SC in relation to NA (for NA<0.53) when the thick cover type optical disc is used.

As shown in FIG. 6A, the spherical aberration has a gap of approximately 200 micrometers between the inside area Rin and the outside area Rout. Therefore, the light beam passed through the outside area Rout is sufficiently diffused in contrast to the beam spot formed by the light beam passed through the inside area Rin.

Figure 7:
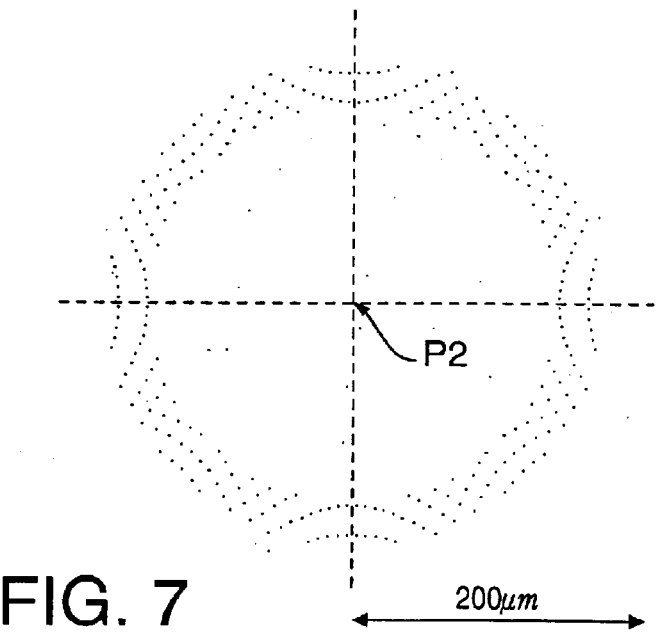
FIG. 7 shows a spot diagram on the information layer of the optical disc when the objective lens of the second embodiment is used.

FIG. 7 shows a spot diagram on the information layer when the thin cover type optical disc is used. It should be noted that the light beam passed through the inside area Rin converges onto a point P2, while the light beam passed through the outside area Rout is diffused over an annular area which is spaced from the point P2 by approximately 100 micrometers. Therefore, the light beam passed through the outside area Rout does not affect the beam spot formed by the light beam passed through the inside area Rin.

As described above, a gap of the spherical aberration (shown in FIG. 4A and FIG. 6A) is caused between the inside area Rin and the outside area Rout so as to prevent the light beam passed through the outside area Rout from affecting the beam spot formed by the light beam passed through the inside area Rin. According to the above-described embodiments, the gap of the spherical aberrations is caused by forming the outside area as a surface which does not have a diffraction lens structure, and is continuously connected to the base curve of the high NA exclusive area RE.

Alternatively, the affect of the light beam incident on the outside area Rout of the lens can also be prevented by forming the outside area Rout as a reflective surface, a light absorptive surface or a light scattering surface. If the outside area Rout is formed to be the light scattering surface, however, it becomes necessary to scratch the outside area in a random fashion to form the scattering surface after the molding process. Further, if the outside area Rout is formed to be the reflective surface or the light absorptive surface, it becomes necessary to coat the outside area Rout. In view of such an extra process required, the configuration according to the embodiments is advantageous in comparison with the alternative configurations above.

The present disclosure relates to the subject matter contained in Japanese Patent Application No. 2000-236717, filed on Aug. 4, 2000, which is expressly incorporated herein by reference in its entirety.

What is claimed is:

1. An objective lens for an optical pick-up configured for use with optical discs of a first format and a second format, the first format having higher information density than the second format, at least one surface of said objective lens being an aspherical surface, said at least one surface being divided into an effective area and an outer area outside said effective area, said effective area and said outer area being formed such that a predetermined gap is caused between a spherical aberration of a light beam passed through said effective area and a spherical aberration of a light beam passed through said outer area, a diffraction lens structure being formed on said at least one surface within said effective area, said outer area being connected with a base curve which is a macroscopic shape of said at least one surface within said effective area, the light beam passed through said effective area forming a beam spot on a predetermined surface of an optical disc, the light beam passed through said outer area being diffused on the predetermined surface in comparison with the beam spot, said effective area including a common area through which light passes for forming a beam spot on optical discs of either the first format or the second format, and an exclusive area through which light passes for forming a beam spot on optical discs of the first format but not the second format.

2. The objective lens according to claim 1, said diffraction lens structure including a plurality of concentric annular zones formed on said at least one surface.

3. The objective lens according to claim 2, wherein an absolute value of said gap is equal to or greater than 10 micrometers.

4. The objective lens according to claim 3, wherein an absolute value of said gap is approximately 200 micrometers.

5. The objective lens according to claim 1, wherein said at least one surface in said outer area is a continuous surface having no diffraction lens structure.

6. An objective lens for an optical pick-up configured for use with optical discs of a first format and a second format, the first format having higher information density than the second format, at least one surface of said objective lens being an aspherical surface, said at least one surface being divided into an effective area and an outer area outside said effective area, a diffraction lens structure being formed on said at least one surface within said effective area, said outer area being connected with a base curve which is a macroscopic shape of said at least one surface within said effective area, said effective area and said outer area being formed such that the light beam passed through said effective area forming a beam spot on a predetermined surface of an optical disc, the light beam passed through said outer area being diffused on the predetermined surface, said effective area including a common area through which tight passes for forming a beam spot on optical discs of either the first format or the second format, and an exclusive area through which light passes for forming a beam spot on optical discs of the first format but not the second format.

7. An objective lens for an optical pick-up configured for use with optical discs of a first format and a second format, the first format having higher information density than the second format, at least one surface of said objective lens comprising an aspherical surface, said at least one surface being divided into an effective area and an outer area outside said effective area, said at least one surface within said effective area comprising a diffraction lens structure, a surface of said outer area having a curve with a macroscopic shape of said at least one surface within said effective area, said effective area and said outer area being configured such that a light beam passing through said effective area forms a beam spot on a predetermined surface of an optical disc, the light beam passing through said outer area being diffused on the predetermined surface, said effective area including a common area through which light passes for forming a beam spot on optical discs of either the first format or the second format, and an exclusive area through which light passes for forming a beam spot on optical discs of the first format but not the second format.

8. The objective lens according to claim 7, said diffraction lens structure comprising a plurality of concentric annular zones formed on said at least one surface.

9. The objective lens according to claim 8, said outer area comprising a continuous surface without a diffraction lens structure.

10. The objective lens according to claim 7, said outer area being configured such that a predetermined gap is provided between a spherical aberration of the light beam passing through said effective area and a spherical aberration of a light beam passing through said outer area.

11. The objective lens according to claim 10, wherein an absolute value of said predetermined gap is at least equal to 10 micrometers.

12. The objective lens according to claim 10, wherein an absolute value of said predetermined gap is approximately 200 micrometers.

* * * * *